United States Patent [19]
Cutler

[11] Patent Number: 5,263,369
[45] Date of Patent: Nov. 23, 1993

[54] FLOW SENSOR SYSTEM AND METHOD

[75] Inventor: Charles W. Cutler, San Bernardino, Calif.

[73] Assignee: Bear Medical Systems, Inc., Riverside, Calif.

[21] Appl. No.: 919,596

[22] Filed: Jul. 24, 1992

[51] Int. Cl.⁵ .............................................. G01F 1/68
[52] U.S. Cl. .................... 73/204.15; 73/204.18
[58] Field of Search .......... 73/204.15, 204.18, 204.19, 73/204.25

[56] References Cited

U.S. PATENT DOCUMENTS

| | | | |
|---|---|---|---|
| Re. 33,076 | 10/1989 | Sugiura | 73/204.15 |
| 2,726,546 | 12/1955 | King, Jr. | 73/204 |
| 3,645,133 | 2/1972 | Simeth et al. | 73/204 |
| 3,648,518 | 3/1972 | Hans et al. | 73/204 |
| 3,747,577 | 7/1973 | Mauch et al. | 123/32 |
| 3,995,481 | 12/1976 | Djorup | 73/189 |
| 4,043,196 | 8/1977 | Trageser | 73/204 |
| 4,083,244 | 4/1978 | Agar et al. | 73/204 |
| 4,244,217 | 1/1981 | Ledbetter | 73/204 |
| 4,363,238 | 12/1982 | William | 73/204 |
| 4,373,387 | 2/1983 | Nishimura et al. | 73/204 |
| 4,400,974 | 8/1983 | Nishimura et al. | 73/118 |
| 4,474,058 | 10/1984 | Drews et al. | 73/118.2 |
| 4,534,218 | 8/1985 | Ueno | 73/204 |
| 4,537,068 | 8/1985 | Wrobel et al. | 73/202 |
| 4,562,731 | 1/1986 | Nishimura et al. | 73/202 |
| 4,685,324 | 8/1987 | Bourdon et al. | 73/3 |
| 4,756,670 | 7/1988 | Arai | 417/43 |
| 4,779,458 | 10/1988 | Mawardi | 374/41 |
| 4,807,151 | 2/1989 | Citron | 364/510 |
| 4,845,984 | 7/1989 | Hohenstatt | 73/204.15 |
| 4,854,167 | 8/1989 | Czarnocki et al. | 73/204.19 |
| 4,885,938 | 12/1989 | Higashi | 73/204.18 |
| 4,905,514 | 3/1990 | Wiseman | 73/204.18 |
| 4,916,948 | 4/1990 | Inada et al. | 73/202.5 |
| 4,938,061 | 7/1990 | Carp | 73/204.19 |
| 5,036,702 | 8/1991 | Akamatsu et al. | 73/204.15 |

Primary Examiner—Herbert Goldstein
Attorney, Agent, or Firm—Klein & Szekeres

[57] ABSTRACT

A gas flow sensor system, using hot wire flow and temperature sensors, compensates and corrects for various factors, such as water vapor content and gas composition in the measured gas, gas temperature, physical differences in the sensors, ambient atmospheric pressure, and nonlinearities in the system. Physical differences in the sensors are corrected by adjusting the magnitude of the constant current flowing to the temperature sensor. Water vapor content and gas temperature corrections are made by modifying a flow temperature signal based on the resistance of the temperature sensor to form a flow reference signal indicative of a desired resistance difference between the resistances of the temperature and flow sensors, which resistance difference varies with the flow temperature signal. The flow reference signal is compared to a flow resistance signal (indicative of the resistance of the flow sensor) and the resulting flow correction signal is used to control the current flow to the flow sensor. A flow output signal based on the current flow to the flow sensor provides an indication of flow rate. This flow output signal can then be corrected for the composition of the gas being measured. This composition corrected output can then be further corrected for nonlinearities in the system by use of a look-up table. This further corrected output signal can then be still further corrected for such factors as ambient pressure and standard temperature.

16 Claims, 5 Drawing Sheets

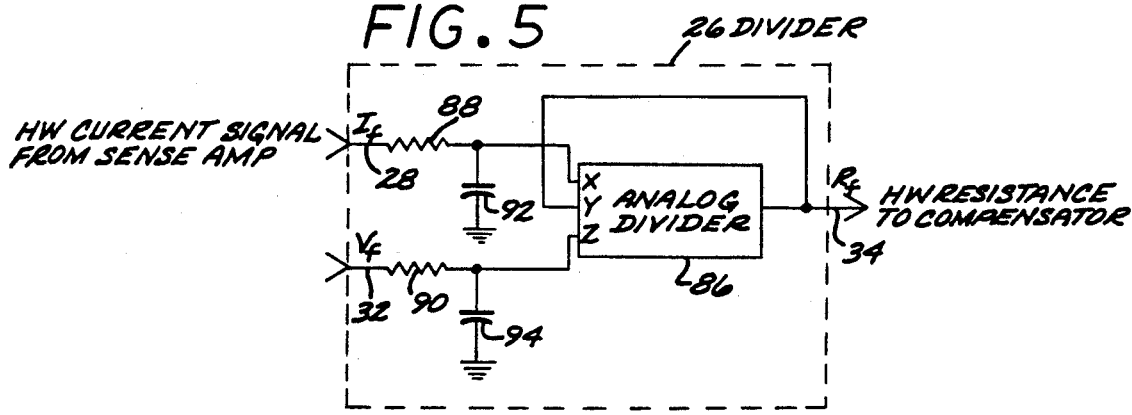
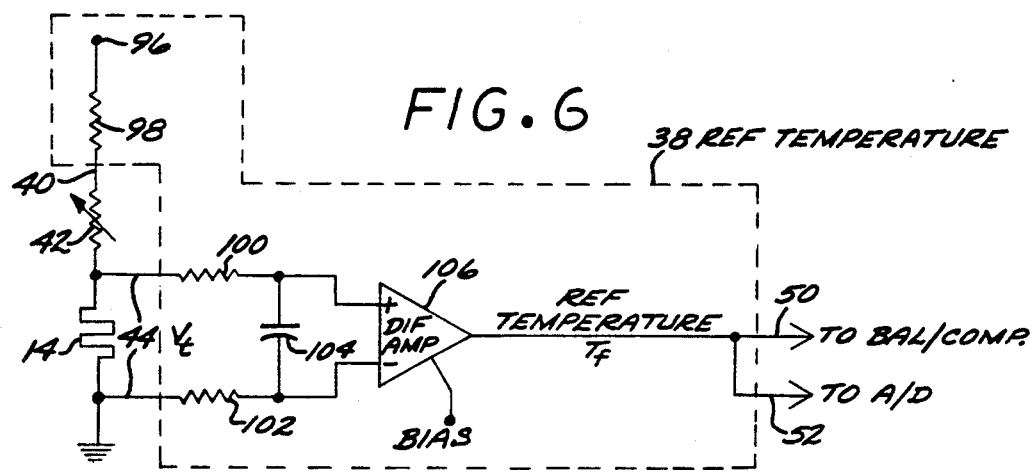
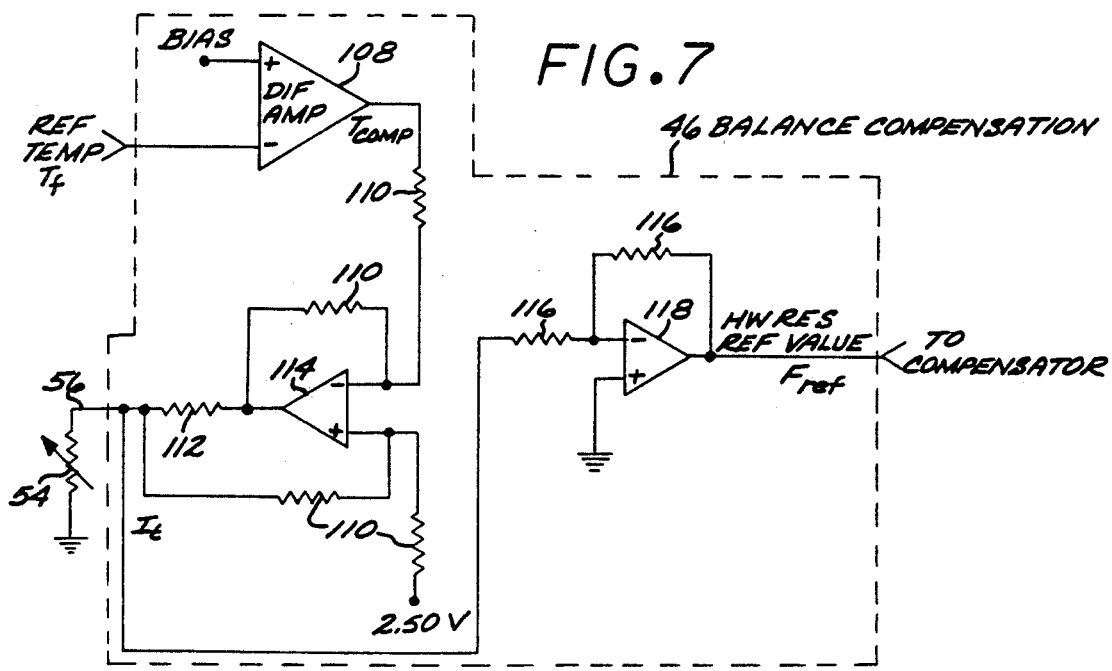

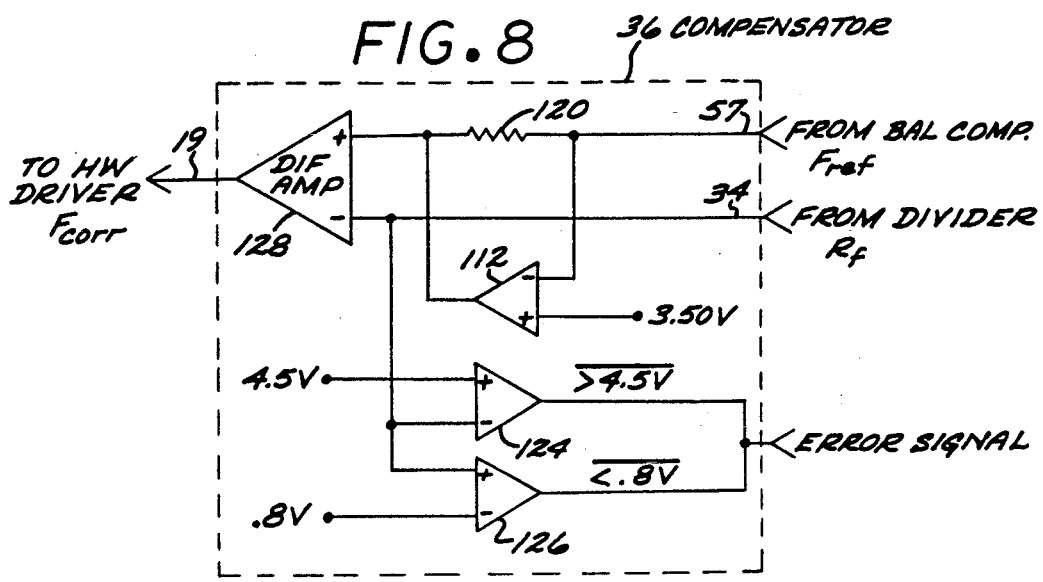
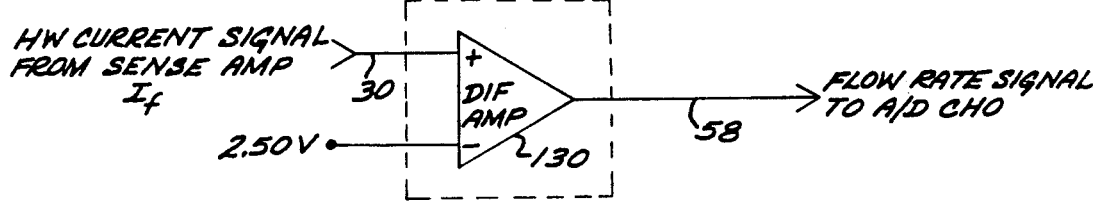
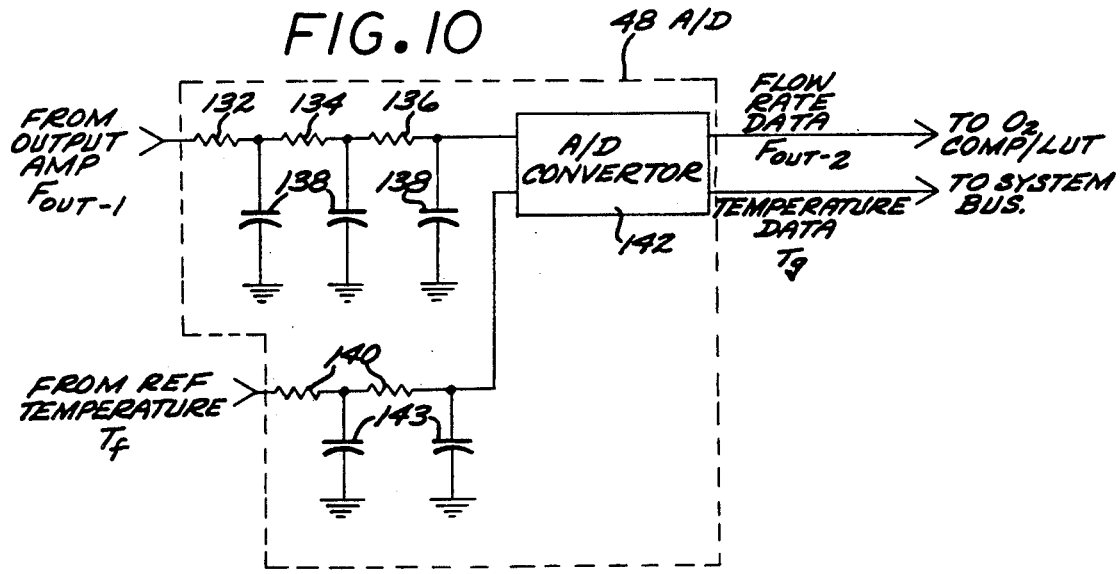

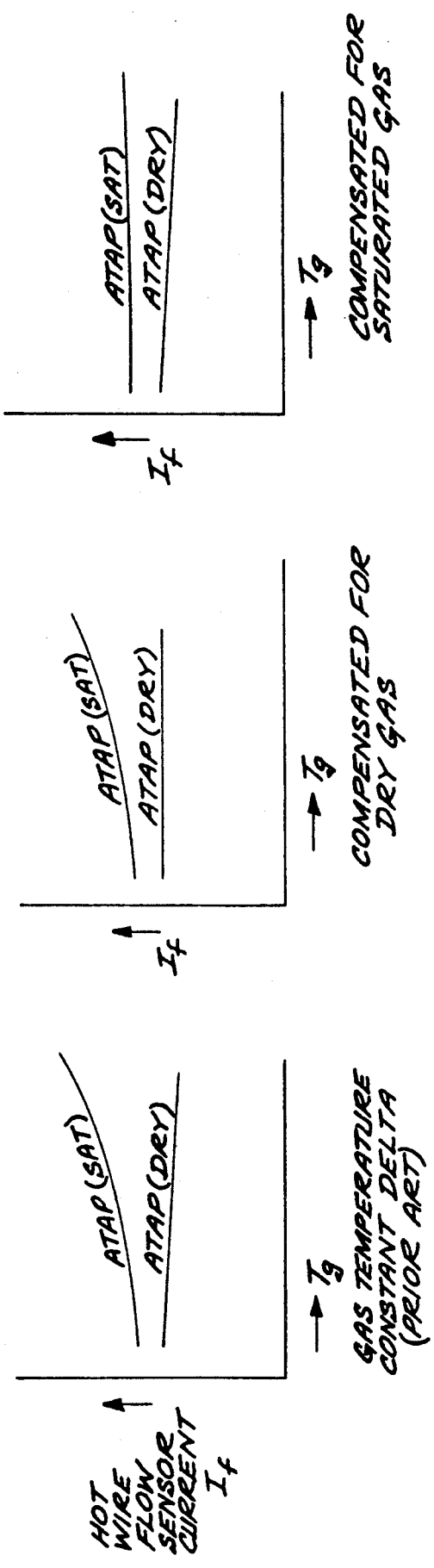

FLOW SENSOR SYSTEM AND METHOD

BACKGROUND OF THE INVENTION

The present invention relates generally to the field of flow measurement of gases. More particularly, it relates to the measurement of gas flow where accuracy is important, such as in a medical ventilator or ventilation monitor.

Many types of flow sensing systems have been used to measure the gas flow in pressurized gas systems, such as those in a ventilator. One commonly used method is called a hot wire anemometer in which a bridge circuit is used and the magnitude of the current to a hot wire in the gas flow gives an indication of the gas flow.

The current flow through the hot wire is a function of the gas velocity as well as other factors such as the transport properties of the gas (thermal conductivity, density and viscosity) and the temperatures of the gas and the hot wire. The resistance of the wire varies with the temperature of the wire for commonly used wires such as platinum.

Early versions of the hot wire anemometer measured the hot wire sensor current while trying to maintain a constant resistance in the sensor. This was not particularly accurate because the current, while a function of flow rate, is also to some extent dependent on the temperature and transport properties of the gas. Thus the output would be accurate only for one gas within a narrow temperature range.

To help improve the accuracy, this configuration has been modified to provide for a constant temperature difference (delta) between the hot wire sensor and a similar sensor substantially unaffected by flow rate which is used to sense the temperature of the gas. However, even these constant temperature difference hot wire flow sensor systems do not necessarily provide the accuracy needed for some applications, in that they are still sensitive to changes in the transport properties of the gas such as thermal conductivity, density and absolute viscosity, and are also somewhat sensitive to gas temperature changes. Accuracy in such systems is particularly compromised where the gas composition changes and/or the water vapor content is significant (i.e. humidified gas).

More recent examples of flow sensors that have somewhat effective temperature compensation arrangements are disclosed in U.S. Pat. Nos. 4,807,151 and 4,854,167. However, both of these are limited in their ability to accurately temperature compensate because they require the use of bridge circuits.

SUMMARY OF THE INVENTION

The present invention is a flow sensor system and method that is able to compensate and correct for a wide variety of factors so as to give a highly accurate indication of flow rate. Some of the factors that can be compensated and/or corrected for include physical differences between the temperature sensors and the flow sensors, the gas water vapor content and temperature, the composition of the gas, nonlinearities in the system, and the ambient atmospheric pressure. The flow sensor system of the subject invention is able to provide much of this compensation/correction because it does not use a conventional bridge circuit.

The system uses two sensors in the gas flow stream: a hot wire flow sensor sensitive to the flow rate of the gas, and a temperature sensor substantially unaffected by the flow rate but sensitive to the temperature of the gas.

Physical differences in the sensors are corrected by adjusting the magnitude of the constant current flowing to the temperature sensor.

Water vapor content and gas temperature corrections are made by modifying a flow temperature signal based on the resistance of the temperature sensor to form a flow reference signal indicative of a desired resistance difference between the resistances of the temperature sensor and the flow sensor. This resistance difference is not constant, but rather varies with the flow temperature signal. The flow reference signal is compared to a flow sensor resistance signal (indicative of the resistance of the flow sensor) and the resulting flow correction signal is used to control the current flow to the flow sensor. A flow output signal based on the current flow to the flow sensor provides an indication of flow rate.

This flow output signal can then be corrected for the composition of the gas. This corrected output can then be further corrected for nonlinearities in the system by use of a look-up table. The resulting output signal can then be still further corrected for ambient atmospheric pressure, standard temperature and dry gas conditions to yield a fully corrected output signal very accurately representing the gas flow.

Thus a primary object of the subject invention is to provide a flow sensing system and method that compensate for the water vapor content as well as the temperature of the gas.

Another object of the subject invention is to provide a flow sensing system and method that allow the system to be corrected for physical differences between the temperature sensor and the flow sensor.

Yet another object of the subject invention is to provide a flow sensing system and method that allow the output to be corrected for the composition of the gas.

A further object of the subject invention is to provide a flow sensing system and method that allow the output to be corrected for nonlinearities in the system.

Still another object of the subject invention is to provide a flow sensing system and method that allow the output to be corrected for the ambient atmospheric pressure and other physical conditions.

BRIEF DESCRIPTION OF THE DRAWINGS

FIG. 5 is a simplified electrical schematic of the divider portion of the system;

FIG. 6 is a simplified electrical schematic of the reference temperature portion of the system;

FIG. 7 is a simplified electrical schematic of the balance/compensation portion of the system;

FIG. 8 is a simplified electrical schematic of the compensator portion of the system;

FIG. 9 is a simplified electrical schematic of the output portion of the system;

FIG. 10 is a simplified electrical schematic of the analog to digital convertor portion of the system;

FIGS. 11A-11C include three graphs showing the effect of water vapor content on flow sensor current versus gas temperature under constant flow conditions for three separate compensation configurations.

DETAILED DESCRIPTION OF THE INVENTION

Figure 1:
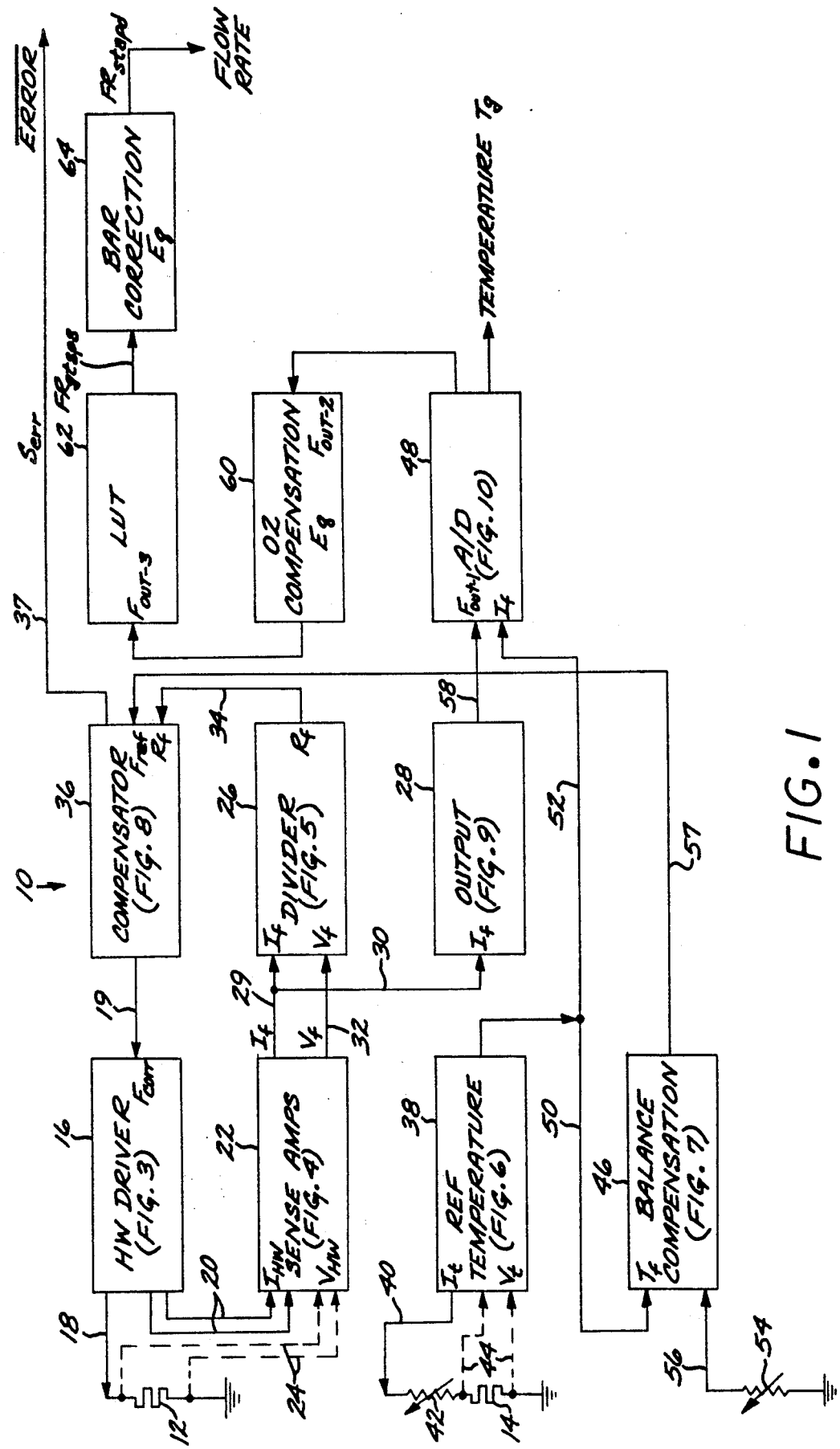
FIG. 1 is a block diagram of the flow sensor system in accordance with the present invention.

Referring now to the drawings, a preferred embodiment of the present invention is described in detail.

FIG. 1 is a block diagram of a flow sensor system 10 in accordance with the preferred embodiment of the subject invention. This diagram includes representations of some of the apparatus of the subject invention as well as black boxes depicted by rectangles in which certain operations take place. Many of these black boxes are shown in some detail in other figures, as noted in FIG. 1. The three black boxes which do not reference other figures (i.e. $O_2$ Compensation, LUT and BAR Correction) relate to operations or steps of the method of the subject invention that are performed on digital signals using a microprocessor or other digital processing devices and are described in greater detail below.

The flow sensor system includes a flow sensing element 12, which is positioned within the gas flow so that it is sensitive to changes in the flow rate of the gas, and a temperature sensing element 14 which is positioned within the gas flow so that it is not sensitive to flow rate changes, but is sensitive to the temperature of the gas.

Figure 3:
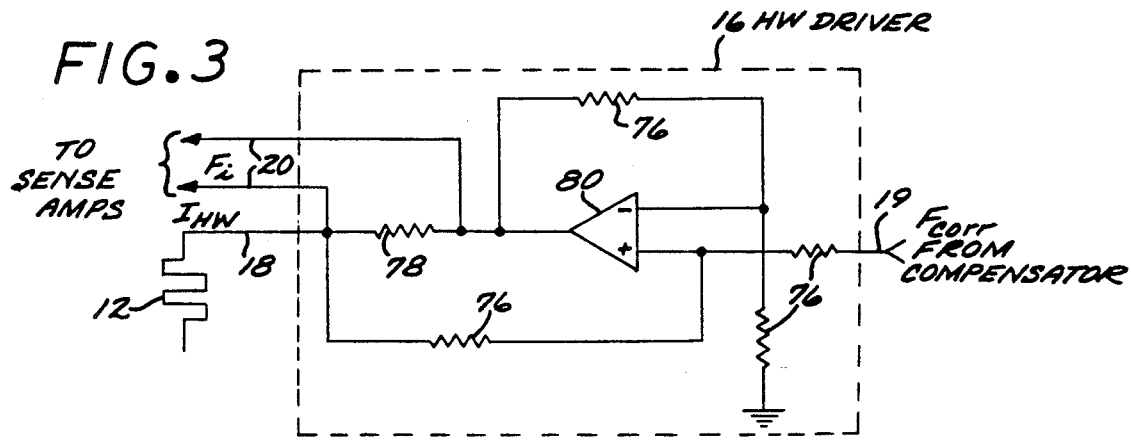
FIG. 3 is a simplified electrical schematic of the hot wire flow sensor driver portion of the system.

The hot wire driver circuitry 16 ("HW Driver"), as more fully described below with reference to FIG. 3, provides a constant drive current to the flow sensing element 12 through a lead 18. The magnitude of the constant drive current is determined by a flow correction signal $F_{corr}$ supplied via lead 19 to the hot wire driver 16, which is discussed below. The hot wire driver 16 also supplies a hot wire current signal $I_{hw}$ via the leads 20 to the sense amplifier circuitry 22 ("Sense Amps"). The value of $I_{hw}$ is proportional to the drive current delivered to the flow sensing element 12.

The voltage drop across the flow element 12, (which may be termed the hot wire voltage signal $V_{hw}$), is sensed by a pair of leads 24 which go to the sense amplifier circuitry 22. The sense amplifier circuitry 22, as more fully described below with reference to FIG. 4, multiplies the hot wire current signal $I_{hw}$ by a factor of 10, giving a flow current signal $I_f$ which is fed to the divider circuitry 26 by a lead 29, and also to output circuitry 28 by a lead 30.

Also within the sense amplifier circuitry 22, the hot wire voltage signal $V_{hw}$ is changed from balanced to unbalanced, resulting in a flow voltage signal, $V_f$ which is fed to the divider circuitry 26 by a lead 32.

The divider circuitry 26, as more fully described below with reference to FIG. 5, divides the flow voltage signal $V_f$ by the flow current signal $I_f$ to give a flow resistance signal $R_f$, which is indicative of the resistance of the flow sensing element 12. The signal $R_f$ is fed by a lead 34 to compensator circuitry 36. Since the resistance of the flow sensing element varies with the temperature of the element, this flow resistance signal $R_f$ is also indicative of the temperature of the flow sensing element 12.

Reference temperature circuitry 38, as more fully described below with reference to FIG. 6, supplies a constant current $I_t$ to the temperature sensor 14 by a lead 40. A variable resistor 42 is provided in series with the temperature sensor 14 to allow adjustment of the constant current $I_t$ to calibrate the temperature sensor 14. The voltage drop across the temperature sensor 14 (temperature voltage signal $V_t$) is sensed by a pair of leads 44 and amplified to provide a flow temperature signal $T_f$. This flow temperature signal is fed to balance compensation circuitry 46 and to analog/digital circuitry 48 ("A/D") by leads 50, 52, respectively.

The balance compensation circuitry 46, as more fully described below with reference to FIG. 7, provides a flow reference signal $F_{ref}$. This signal $F_{ref}$ is based on the flow temperature signal $T_f$, which has been compensated to correct for factors such as water vapor content, temperature nonlinearities, etc., and is balanced by means of a variable resistor 54 which is connected to the balance compensation circuitry 46 by a lead 56. The use of the variable resistor 54 allows balancing of the voltage of the flow reference signal $F_{ref}$ to account for small differences in wire characteristics (such as length, diameter and resistivity) between the flow and temperature sensing elements 12, 14. This flow reference signal $F_{ref}$ is indicative of the desired resistance (in effect the desired temperature) of the flow sensor element 12, compensated for temperature, water vapor content, etc, and preferably includes an offset factor which allows the feedback loop to the compensator circuitry 36 to function properly.

The compensator circuitry 36, as more fully described below with reference to FIG. 8, compares the flow reference signal $F_{ref}$ with the flow resistance signal $R_f$ to form a flow correction signal $F_{corr}$, which is sent to the hot wire driver circuitry 16. The $F_{corr}$ signal, in turn, controls the current to the flow sensing element 12, as discussed above. The compensator circuitry 36 also uses the flow resistance signal $R_f$ to detect a problem, such as an open circuit or short circuit. In the event it detects either problem, an error warning signal $S_{err}$ is sent by a lead 37 to set off a visual or audible warning mechanism (not shown).

The output circuitry 28, as more fully described below with reference to FIG. 9, filters and processes the flow current signal $I_f$ to form a first flow output signal $F_{out\text{-}1}$, which is sent to the analog/digital circuitry 48 by a lead 58.

The analog/digital circuitry 48 converts the analog first output signal $F_{out\text{-}1}$ to a digital second output signal $F_{out\text{-}2}$, indicative of flow. This digital signal is sent to be processed to compensate for composition ($O_2$ Compensation circuitry 60). The flow temperature signal $T_f$ (which is analog) is converted to a digital gas temperature signal $T_{gas}$ which can be used to provide a visual temperature display (not shown).

The second flow output signal $F_{out\text{-}2}$ is processed by digital circuitry and software to correct for varying composition of the gas, i.e. composition compensating. For example, inspiratory gas used in ventilation therapy is frequently air enriched with oxygen, so that the percentage of oxygen in the gas can vary from 21% to 100%. This oxygen percentage is set by the operator, and is used in the following equation to compute a third flow output signal $F_{out\text{-}3}$ which is then sent to a look up table (LUT) 62:

$$F_{out\text{-}3} = F_{out\text{-}2} + 0.33 * (21 - O_2\%) \quad (1)$$

In its preferred embodiment, the flow sensor system 10 of the subject invention is used as part of a ventilator. If used to measure inspiratory gas flow, the composition to be compensated for is primarily a change in oxygen percentage. The flow sensor system can be used to measure expiratory flow where the composition variable is largely $CO_2$ percentage, since, for compensation purposes, the effects of varying $CO_2$ percentage are essentially similar to varying oxygen percentage if the flow sensor system is used in other applications, the second output signal $F_{out-2}$ can be compensated for other changes in gas composition. Of course if the gas composition remains constant, this compensation is not needed.

The third flow output signal $F_{out-3}$ is processed to correct for nonlinearities in the system, and to make other conversion corrections by digital processing of this signal, using the empirically derived look up table 62 to form a first flow rate output signal $FR_{gtsps}$. In the preferred embodiment in which the flow sensor system is used in conjunction with a ventilator, this first flow rate output signal would indicate the volume flow rate at gas temperature and standard pressure, saturated, and more accurately reflects the gas volume flow rate.

Where desired or needed, this first flow rate output signal, $FR_{gtsps}$, can be further processed by the digital circuitry and software as indicated by correction function box 64 to provide a second flow rate output signal $FR_{stapd}$ which corrects to provide an output at standard temperature (298° Kelvin), ambient pressure, dry, in accordance with the following equation:

$$FR_{stapd} = FR_{gtsps} [(14.2 - V_p * T_g) \div BAR] * [298 \div T_g] \quad (2)$$

where $V_g$=the vapor pressure of the gas, $T_g$=temperature in degrees Kelvin of the gas, and BAR=ambient barometric pressure in pounds per square inch, absolute (PSIA).

This second flow rate output signal $FR_{stapd}$ may then be supplied to other equipment (not shown) to provide a display of flow rate, or for other uses.

Figure 2:
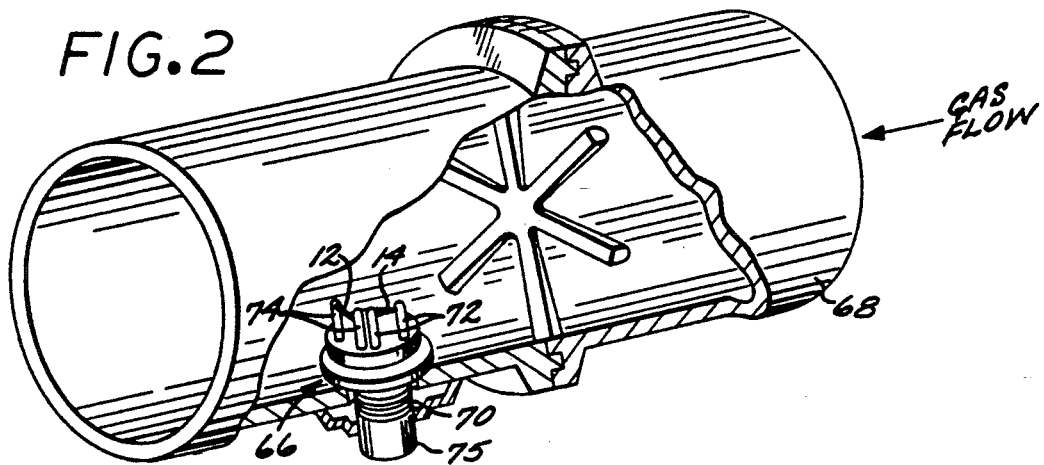
FIG. 2 is a perspective view of a partially cut away flow tube showing the flow and temperature sensors.

FIG. 2 is a perspective view of a hot wire sensor assembly 66 mounted in a flow tube 68 with a portion of the flow tube 68 cut away to show the sensor assembly 66. The sensor assembly 66 includes an insulating base 70, two temperature sensor conductive pins 72 and two flow sensor conductive pins 74, all of which extend up from the base 70. The flow sensing element 12 extends between the exposed ends of the flow sensor pins 74, and the temperature sensing element 14 extends between the exposed ends of the temperature sensor pins 72. The flow and temperature sensing elements are preferably identical, 0.001 inch (0.025 mm) in diameter, 99.999% pure, ref TC platinum wires of a length of approximately 0.27 inch (6.9 mm). Since the resistivity of these wires is about 5 ohms per inch (0.2 ohms per mm), each of the elements 12, 14 has a resistance of about 1.4 ohms at 25° C.

The pins 72, 74 are formed of highly conductive material of relatively large diameter, and therefore they have very low resistance. The wire elements are preferably soldered to the exposed ends of the pins 72, 74. The other ends of the pins 72, 74 are connected to leads, as shown in the accompanying circuit diagrams of FIGS. 4 and 6. A connector 75 is shown at the end of the assembly 66 opposite the sensing elements 12, 14 to permit the flow tube 68 and sensor assembly 66 to be easily connected and disconnected to the remainder of the flow sensor circuitry.

FIG. 3 shows the simplified circuit 16 labeled HW Driver within the dashed lines). This is a floating ground current generator, well known in the art, whose output current through the lead 18 is proportional to the voltage of the input signal $F_{corr}$ through the lead 19.

This circuit 16 is preferably formed of four substantially equal resistors 76 (preferably of 1.0K ohms), a resistor 78 (preferably of 1.0 ohm) and a differential amplifier 80. The voltage developed across the resistor 78 is compared with the voltage of signal $F_{corr}$ coming from the compensator 36. Therefore the drive current to the sensor element 12 equals the voltage of the $F_{corr}$ signal divided by the resistance of the resistor 78. The leads 20 across the resistor 78 are used to sense the signal $I_{hw}$, sometimes referred to as the flow sensor current signal. This signal has a value proportional to the drive current going to the flow sensing element 12.

Figure 4:
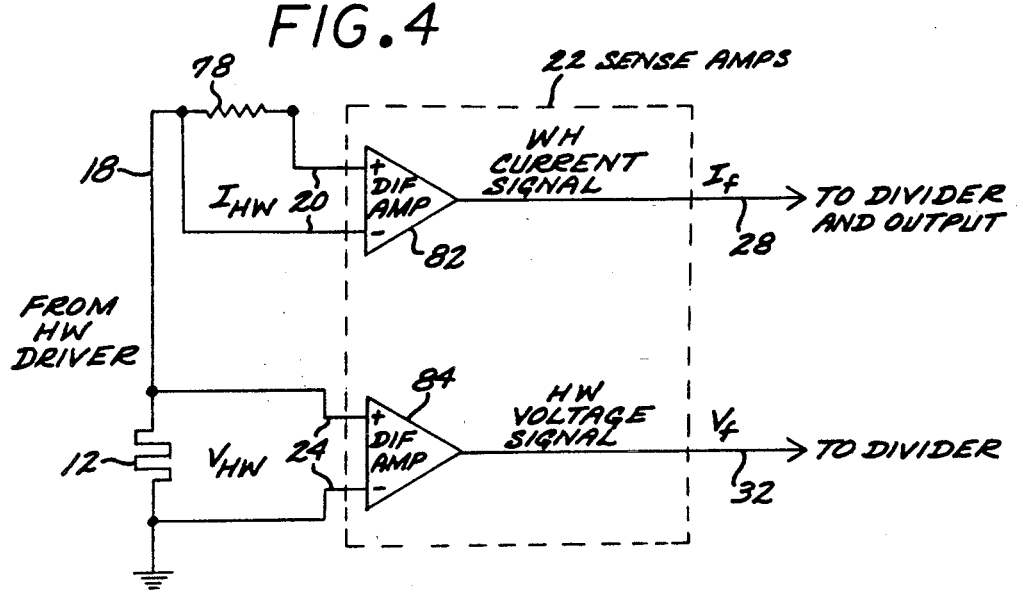
FIG. 4 is a simplified electrical schematic of the sense amplifier portion of the system.

FIG. 4 shows the simplified circuit 22 labeled Sense Amps (within the dashed lines). The circuit 22 uses two differential instrumentation amplifiers 82, 84 to change the input signals $I_{hw}$ and $V_{hw}$ (which are proportional to the current going through, and the voltage across the flow sensing element 12) from balanced signals to unbalanced signals. The gain of the first amplifier 82 is 10, to accommodate the transfer function of the divider 26, and to provide a suitable span for the output circuit 28. The gain of the second amplifier 84 is 1. The output signals from the amplifiers 82, 84 are the flow current signal $I_f$ and the flow voltage signal $V_f$. Both of these signals are fed to the divider 26, and the flow current signal $I_f$ is also fed to the output circuitry 28.

FIG. 5 shows the simplified circuit 26 labeled Divider (within the dashed lines). The primary component of the divider 26 is an analog multiplier IC 86, used in the divide configuration, having inputs labeled X, Y, and Z. The input signals $I_f$ AND $V_F$ are filtered by resistors 88, 90 (preferably 1.0K ohms) and capacitors 92, 94 (preferably 1 nf) before being fed to inputs X and Z respectively. The divider 26 provides a signal $R_f$ proportional to the resistance of the flow sensing element 12 by dividing the sensor element voltage by the sensor element current according to the following formula:

$$R_f = 10 * [V_{hw}] \div [I_{hw} * 10] = 10 * [V_f] \div [I_f] \quad (3)$$

This flow sensor resistance signal $R_f$ is fed to the compensator 36 (described in detail below) via the lead 34.

FIG. 6 shows the simplified circuit 38 labeled Ref Temperature (within the dashed lines). The reference temperature driver and sense circuit 38 produces an output signal $T_f$ indicative of the resistance of the temperature sensing element 14 (and hence the temperature of the gas) by sensing the voltage across the temperature sensing element 14 under constant current A constant current (nominally 4.5 mA) is supplied from a voltage tap 96 (at 4.5 volts) through a fixed resistor 98 (preferably 1.0K ohms) and variable resistor 42 (preferably rated at 100 ohms maximum) to the temperature sensing element 14. The variable resistor 42 allows the amount of current to be adjusted slightly to calibrate each temperature sensing element 14 to a fixed temperature (preferably 30° C.). It should be noted that the current flow through the temperature sensing element 14 causes the wire to self heat to about 5.5° C. above ambient during low flow conditions. However, the effect of this self heating is compensated in the look up table 62.

The leads 44 are used to sense the voltage $V_t$ across the temperature sensing element 14. Fixed resistors 100,102 (preferably 1.0K ohms) and a capacitor 104 (preferably 1 microfarad) are used to filter this signal $V_t$. This filtered signal is fed to a differential amplifier 106 (preferably with a gain of 200 and a bias of 82 mV). The resulting temperature output signal $T_f$ is therefore indicative of the gas temperature in degrees Kelvin. This temperature output signal $T_f$ is fed to the balance compensator 46 via the lead 50 and also to the analog to digital circuitry 48 via the lead 52.

FIG. 7 shows the simplified circuitry 46 labeled Bal/-Compensation (within the dashed lines). This balance compensation circuitry 46 is used to provide a temperature reference signal $F_{ref}$ which is balanced to account for minor differences in the wire characteristics between the flow sensing element 12 and the temperature sensing element 14 and compensated for the effects of changes of temperature and water vapor content.

The compensation of the circuitry 46 is provided by means of a differential amplifier 108 using the reference temperature output signal $T_f$ as the negative input and a bias voltage as the positive input. The bias and gain of the amplifier are used to approximate the compensation needed. Even though the compensation needed to make the flow sensor current $I_f$ constant for a given flow rate of saturated gas over the operating temperature range is nonlinear, for a reasonable temperature range the compensation needed can be approximated by adjusting the starting point (by the bias) and the slope (by the gain) of the compensation curve. This relationship is more fully explained below regarding the curves of FIG. 11. For the temperature range (20°–30° C.) and water vapor content (saturated) normally encountered in the gas flowing in a ventilator and the units of the signal desired to be in ambient temperature and pressure (ATAP), preferably the gain of the amplifier 108 is 0.5 and the offset bias is 0.814 volts. The offset bias also includes an amount sufficient to properly bias the resulting signal $F_{ref}$ to allow the compensation circuitry 36 to work properly.

If the flow sensor system 10 is to be used with dry gas, gas with a water vapor content less than saturated and more than dry, gas having a different temperature range, or if the units are desired to be other than ATAP, the bias and/or gain of the amplifier can be modified to provide the proper compensation. In fact, while not shown, it is contemplated, in accordance with the subject invention, that a humidity sensor could be employed to sense the water vapor content in the gas and vary the gain of the amplifier accordingly so as to better compensate for varying humidity of the gas. This, of course, would be most useful in applications where the humidity of the gas whose flow rate is being sensed would vary considerably. In fact, even more accurate compensation could be made by use of digital circuitry in which the signal could be processed in accordance with a functional relationship that need not be linear, such as by the use of an empirically derived look-up table.

The output signal $T_{comp}$ from the amplifier 108 is then sent to a current generator formed of four substantially identical resistors 110, another resistor 112 and an operational amplifier 114. In the preferred embodiment the resistors 110 are each 100K ohms and the resistor 112 is 120 ohms. The variable resistor 54 (rated at 175 ohms maximum) is connected to the output of this current generator to allow balancing of the output signal $I_t$ (by adjusting the current). This balancing is a form of calibration of the temperature sensing element 14 with respect to the flow sensing element 12 to account for minor differences in wire characteristics, such as length, diameter, and resistivity. Once this balancing/calibration is done (normally by the manufacturer of the system), then the entire assembly 66 need not be further calibrated in the field. The output signal $I_t$ is then fed to an inverter circuit formed by two resistors 116 and a differential amplifier 118. The inverted output of the amplifier 118 is an output signal $F_{ref}$ which is fed by a lead 57 to the compensator circuitry 36, as shown in FIG. 1.

FIG. 8 shows the simplified circuitry 36 labeled Compensator (within the dashed lines). The compensator circuitry 36 compares the $F_{ref}$ and $R_f$ signals from the balance compensator 46 and divider 26, respectively and provides a gain of 10 to the difference between the signals. It also provides an error signal if the signal from the divider 26 is outside its normal range.

A fixed resistor 120 (preferably 10K ohms) and a comparator 122 (preferably with a positive input of 3.5 volts) in parallel with the resistor 120 prevent the signal $F_{ref}$ from being too large and therefore overdriving the flow sensor element 12 and possibly burning out the wire. In the preferred embodiment this signal is prevented from exceeding 3.5 volts.

Also the signal $R_f$ is also connected to the negative input of a first comparator 124 and to the positive input of a second comparator 126. The first comparator 124 has a higher voltage (preferably 4.5 volts) connected to its positive input so that an error signal is formed when signal $R_f$ exceeds this higher voltage. This could occur if there were an open circuit or very high resistance in the flow sensing element 12. The second comparator 126 has a lower voltage (preferably 0.8 volts) connected to its negative input so that an error signal is formed when the signal $R_f$ is less than this lower voltage. Such a condition could occur if there was a short in the flow sensing element 12.

Subject to the above mentioned signal limiter, the signal $F_{ref}$ from the balance compensator 46 goes to the positive input of a differential amplifier 128 and the signal $R_f$ from the divider 26 goes to the negative input. The amplifier 128 preferably has a gain of 10 and provides an output correction signal $F_{corr}$ to the HW driver 16 to control the current flow to the flow sensing element 12, as discussed above regarding FIG. 3.

FIG. 9 shows the simplified circuitry 28 labeled Output (within the dashed lines). This circuitry 28 processes the flow sensor current signal $I_f$ to make it suitable for analog to digital conversion. The flow sensor current signal $I_f$ goes to the positive input of a differential amplifier 130. This amplifier 130 preferably has a gain of 1.65 and an offset bias (to the negative input) of 2.5 volts, thereby converting the 2.5–5.5 volt current signal $I_f$ to a 0–4.5 volt output signal $F_{out-1}$ which is sent to the A/D circuitry 48 by a lead 58, as shown in FIG. 1.

FIG. 10 shows the simplified circuitry 48 labeled A/D (within the dashed lines). This circuitry takes the analog flow sensor signal F out-1 and the analog gas temperature signal $T_f$ and filters and changes them into digital signals $F_{out-2}$ and $T_g$, respectively. Fixed resistors 132, 134, 136 and capacitors 138 help filter the analog flow signal $F_{out-1}$. Preferably resistors 132, 134, 136 are 1K, 1.5K and 3.6K ohms, respectively, and capacitors 138 are each 68 nf.

Similarly, fixed resistors 140 and capacitors 143 are used to filter the analog gas temperature signal $T_f$. Preferably resistors 140 are each 10K ohms and capacitors 143 are each 0.47 micro farads.

Both analog signals $F_{out-1}$ and $T_f$ after they are filtered are inputted to an analog to digital convertor 142 (preferably a 10 bit, 11 input analog-to-digital convertor), and are thereby converted to digital output signals $F_{out-2}$ and $T_g$, which are indicative of the flow rate of the gas and the temperature of the gas, respectively. Preferably the clock for A/D convertor 142 oscillates at about 1.8 MHZ.

The gas temperature signal $T_g$ goes to the system bus for output or use elsewhere. The flow rate signal $F_{out-2}$ is thereafter compensated for gas composition, forming the signal $F_{out-3}$ before being corrected for nonlinearities using look up table 62, as described above in regard to FIG. 1. The resulting signal $FR_{gtsps}$ is then corrected for standard temperature, ambient pressure, dry conditions by the processing indicated as box 64, labeled bar correction in FIG. 1, as explained above. Obviously, the correction processing depends on the units one wishes the flow rate output to be in. For example, the output could very well be expressed in liters per minute at standard temperature and pressure, dry or ambient temperature and pressure, dry.

The resulting signal $FR_{stapd}$ is then fed into other parts of the equipment involved for display and/or use in conjunction with other signals and information. For example, in a ventilator, if the flow sensor system 10 is used to measure the flow out through exhalation valve (not shown) this measured flow may be compared to the flow delivered to the patient.

The graphs shown in FIG. 11 all show the current flow $I_f$ to the flow sensor element versus temperature of the gas $T_g$ under a constant flow condition. In each of the three graphs, the lower curve is for gas at ambient temperature and pressure, dry (ATPD) and the upper curve is for the same gas at ambient temperature and pressure, saturated (ATPS).

The graph shown in FIG. 11(A) depicts situations where balance-compensation circuitry maintains the temperature of the flow sensing element at a constant delta from the temperature of the flow sensing element, as taught by the prior art. This shows that, at constant flow, even for dry gas, as the gas temperature increases the flow sensor current decreases if the delta temperature remains constant. However, if the gas has a high water vapor content, such as in saturated gas, the relationship is substantially different. Therefore if the delta temperature were maintained constant, there could be substantial error in using the flow sensor current to indicate flow rate.

FIG. 11(B) shows the curves when the balance compensation compensates the gas temperature signal to make the flow sensor current substantially constant over a desired temperature range for constant flow. The subject invention, with specific values for some of the balance compensation circuitry properly adjusted (the gain and bias of amplifier 108), would cover such compensation. However, if the flow became saturated, there still would be some substantial error.

FIG. 11(C) shows the curves when the balance compensation, as specifically disclosed herein in the preferred embodiment, compensates the gas temperature signal to make the flow sensor current substantially constant over a desired temperature range for constant flow.

While the flow sensor system and method of the subject invention have been disclosed in their preferred form for use in a ventilator application, it is contemplated that for this or other applications, the invention may be implemented in other forms as would be obvious to ones skilled in the art, without departing from the true scope and spirit of the invention. For example, other forms of current generators might be used in the circuitry. Also, whereas many of the steps are disclosed as being implemented using analog circuitry and signals, suitable digital circuitry and software could be used to provide similar processing of converted digital signals. Further, the subject invention would also apply to other configurations of hot wire sensing elements. For example any known device for sensing the temperature of the gas could be used to generate a gas temperature signal.

What is claimed is:

1. A method for measuring the flow of a gas using a hot wire anemometer sensor assembly having a flow sensing element and a temperature sensing element within the gas flow being measured, comprising of the steps of:
    sensing the voltage drop across said flow sensing element and generating a flow voltage signal indicative thereof;
    sensing the current flow to said flow sensing element and generating a flow current signal indicative thereof;
    dividing the flow voltage signal by said flow current signal to form a flow resistance signal;
    inputting a constant current to said temperature sensing element;
    sensing the voltage drop across said temperature sensing element and using this to generate a flow temperature signal indicative of the temperature of the gas flow;
    compensating said flow temperature signal to obtain a flow reference signal indicative of a desired resistance difference between said flow sensing element and said temperature sensing element, which desired resistance difference varies with the flow temperature signal;
    comparing said flow reference signal with said flow resistance signal and generating a flow current correction signal;
    using said flow current correction signal to modify the current flow to said flow sensing element; and
    generating a flow output signal indicative of the gas flow rate from said flow current signal.

2. A method as in claim 1, further including the step of:
    adjusting the magnitude of the constant current to said temperature sensing element to account for differences in sensor characteristics between the actual flow sensing element and temperature sensing element being used.

3. A method as in claim 1, further including the step of:
    correcting said flow output signal to compensate for differing gas composition of the gas flow, thereby forming a composition compensated output signal.

4. A method as in claim 1, further including the step of:
    correcting said flow output signal for nonlinearities in the sensor assembly, thereby forming a corrected output signal.

5. A method as in claim 3 further including the step of:
    correcting said composition compensated output signal for nonlinearities in the sensor assembly, thereby forming a corrected output signal.

6. A method as in claim 4, wherein said step of correcting said flow output signal for nonlinearities utilizes a look up table whose values are defined by empirical testing.

7. A method as in claim 1, further including the step of:
correcting said flow output signal to account for the ambient atmospheric pressure, thereby forming a barometric corrected output signal.

8. A method as in claim 5 further including the step of:
correcting said corrected output signal to account for the ambient atmospheric pressure, thereby forming a barometric corrected output signal.

9. A flow sensor system for measuring the flow of a gas through a tube including:
a flow sensing element located within said tube in an orientation so as to be sensitive to the flow rate of the gas through said tube;
a temperature sensing element located within said tube in an orientation so as to be insensitive to the flow rate of the gas through said tube and sensitive to the temperature of the gas;
flow current driver means for providing a controlled constant flow of electrical current to said flow sensing element in response to a flow current correction signal;
temperature current driver means for providing a controlled constant electrical current to said temperature sensing element;
flow voltage sensing means for sensing the voltage drop across said flow sensing element and generating a flow voltage signal indicative thereof;
flow current sensing means for sensing the current flow to said flow sensing element and generating a flow current signal indicative thereof;
dividing means for dividing the flow voltage signal by said flow current signal to form a flow resistance signal;
temperature voltage sensing means for sensing the voltage drop across said temperature sensing element and using this voltage drop to generate a flow temperature signal indicative of the temperature of the gas flow;
temperature compensating means for compensating said flow temperature signal to obtain a flow reference signal indicative of a desired resistance difference between said flow sensing element and said temperature sensing element, which desired resistance difference varies with the flow temperature signal;
comparison means for comparing said flow reference signal with said flow resistance signal and generating the flow current correction signal; and
output means for generating a flow output signal indicative of the gas flow rate from said flow current signal.

10. A flow sensor system as in claim 9, further including:
means for adjusting the magnitude of the constant current to said temperature sensing element to account for differences in sensor characteristics between the actual flow sensing element and temperature sensing element being used.

11. A flow sensor system as in claim 9, further including:
composition correcting means for correcting said flow output signal to compensate for differing gas composition of the gas flow thereby forming a composition compensated output signal.

12. A flow sensor system as in claim 9, further including:
nonlinearity correcting means for correcting said flow output signal for nonlinearities in said sensor system, thereby forming a nonlinearity corrected output signal.

13. A flow sensor system as in claim 11, further including:
nonlinearity correcting means for correcting said composition compensated output signal for nonlinearities in said sensor system, thereby forming a nonlinearity corrected output signal.

14. A flow sensor system as in claim 13, wherein said nonlinearity correcting means includes a look up table whose values are defined by empirical testing.

15. A flow sensor system as in claim 9, further including:
barometric correcting means for correcting said flow output signal to account for the ambient atmospheric pressure, thereby forming a barometric corrected output signal.

16. A flow sensor system as in claim 14, further including:
barometric correcting means for correcting said nonlinearity corrected output signal to account for the ambient atmospheric pressure, thereby forming a barometric corrected output signal.

* * * * *